Jan. 14, 1964  I. W. EISENBERG  3,118,087
METER RELAY SYSTEM
Filed June 17, 1960
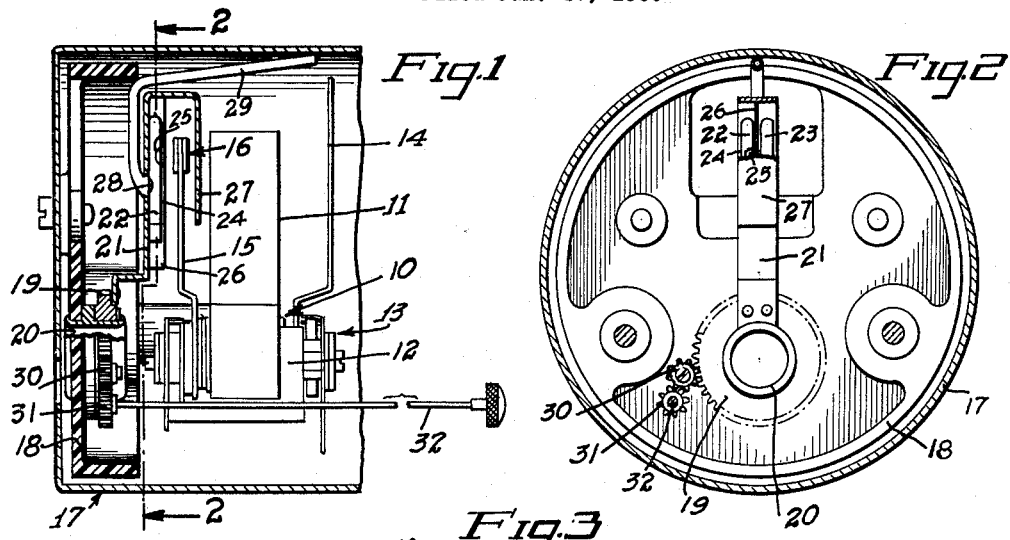
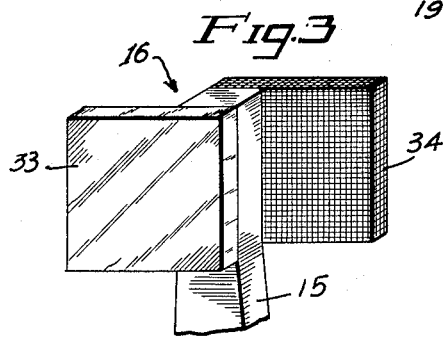
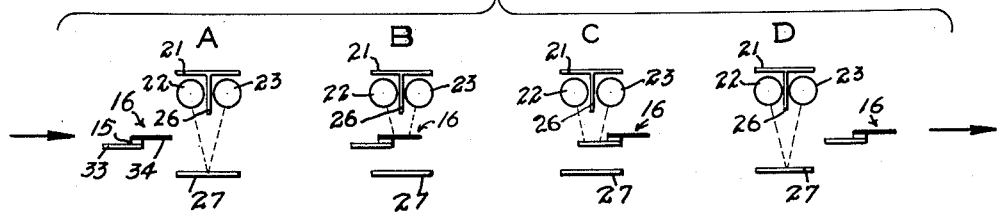
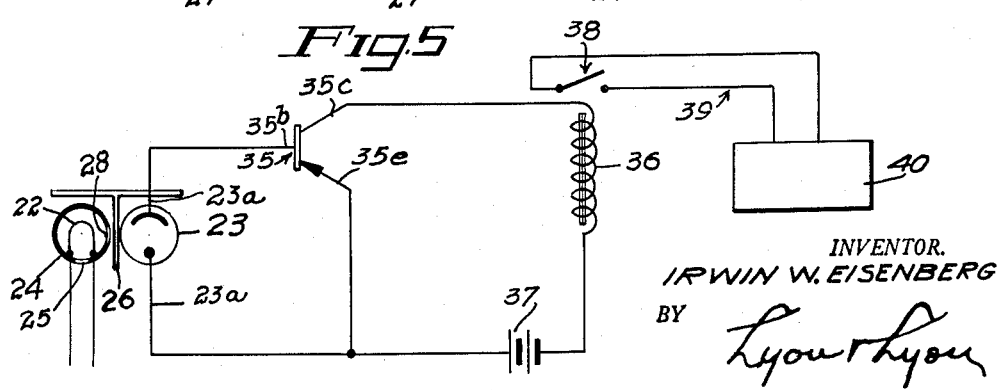
INVENTOR.
IRWIN W. EISENBERG
BY
Lyon & Lyon
ATTORNEYS United States Patent Office 3,118,087
Patented Jan. 14, 1964

3,118,087
METER RELAY SYSTEM
Irwin W. Eisenberg, Pasadena, Calif., assignor to Phaostron Instrument and Electric Company, South Pasadena, Calif., a corporation of California
Filed June 17, 1960, Ser. No. 36,824
8 Claims. (Cl. 317—130)

The present invention relates generally to electric instruments employing a moving coil, permanent magnet assembly of the type commonly used to measure electric current, voltage, etc.

More specifically, the invention relates to the combination of a meter, of the type mentioned, and a relay of usual design, such that the relay may be actuated when the current through the meter reaches a pre-set value, and an important feature of the same is that the linearity and accuracy of said meter is preserved.

A general object, therefore, of the present invention is to provide a meter and relay combination having a maximum degree of linearity and accuracy comparable to a meter which has no relay actuating means.

Another general object of the present invention is to provide a simplified means for actuating a relay at a given level of a parameter, which level is continuously variable and is independent of the required relay actuating current.

Another general object of the present invention is to provide a metered relay actuating device such that said meter continues to function accurately and independently regardless of the state of said relay or the level at which it is to be actuated.

A specific object of the present invention is to provide a relay actuating meter movement wherein an arm attached to the moving coil will pass within a prescribed area, which will cause a variation of a parameter of the relay coil circuit causing a shift in the current therethrough, which will actuate the relay to its opposite state.

Another specific object of the present invention is to provide a metered relay actuating system utilizing the three characteristic current states of a relay.

Other important features and advantages which are believed to be novel are set forth in the appended claims. The invention itself, and further advantages thereof, may be more readily understood when read in connection with the accompanying drawings, in which:

FIGURE 1 is a cross-sectional side elevation of a meter assembly showing some of the elements of the present invention in a preferred embodiment thereof.

FIGURE 2 is a partial front elevation of the meter assembly taken substantially along line 2—2 of FIGURE 1.

FIGURE 3 is an enlarged perspective view of an important feature of the present invention, the same being a tab or mask which is shown generally at 16 in FIGURE 1.

FIGURE 4 is a schematic representation of the sequence of positions occupied by the various elements of the present invention as said elements participate in their relay actuating function.

FIGURE 5 is a schematic circuit diagram showing the method of attaching the photoelectric cell to the relay coil.

A side view of the meter assembly is shown in FIGURE 1. A typical moving coil type meter movement is shown generally at 10. Said movement comprises a magnet 11 and bracket 12 which supports the moving coil assembly 13 within the magnetic field of magnet 11 in the usual manner. Said moving coil assembly is of usual design and has a pointer "cross" or arm 14 attached to the front thereof also in the usual manner. To the rear portion of said moving coil is attached an additional "cross" or arm 15, substantially parallel to arm 14, and that they will move in coincidence one with the other.

The lower portion of arm 15, like arm 14, is in the form of a cross, i.e., having lateral arms upon which counterbalancing weights may be placed to compensate for the mass of the large arm 15. To the top end of arm 15 is attached a tab assembly 16 which will be more completely described in conjunction with FIGURE 3.

To the rear of the meter housing 17 is secured a mounting cup 18 substantially as shown in FIGURES 1 and 2. A positioning gear 19 is affixed to the back of said cup 18 with an aperture 20 through said gear such that electrical connections to the meter and other desired points may pass through the said housing 17 and cup 18 to the rear of the instrument. Affixed to a portion of said gear 19 is an angular bracket 21 extending upward substantially toward the top of the instrument. Affixed to one portion of said bracket 21 is a combination of a photoelectric cell 23 with a light source or lamp 22 in contiguity thereto. Said lamp 22 is surrounded by an opaque shield 24 having an aperture 25 therein, whereby the light from said lamp may be confined to a single beam having a desired direction. The photocell 23 and lamp 22 are separated by another opaque shield 26 which prevents direct transmission of light between the said lamp and said photocell. The frontmost leaf 27 of angle bracket 21 extends downward in front of the lamp-cell combination and is coated on the side facing the lamp and photocell with a light reflecting coating such as white paint or the like, so that the beam from lamp 22 will be reflected thereby and thereupon impinge upon the photocell 23. It is characteristic of such photoelectric cells of the type herein employed, to produce a voltage potential when struck by light, which potential will vary as the intensity of said light varies. Therefore, a voltage potential is produced at the electrodes of said photocell.

A second aperture 28 in the shield 24 is provided on the side opposite to aperture 25 and adjacent said aperture 28 is affixed a light conducting means 29 which conducts the light the length thereof to provide a lighted indicia or index on the face of the instrument, thereby to indicate the position, and therefore the level, at which the desired triggering of the said relay will occur.

As shown in FIGURES 1 and 2, the entire bracket 21 and assembly can be continuously positioned by gear 19. A gear 30 transfers movement from gear 31 to which is attached a shaft 32 extending forward to the front of the instrument. By means of this shaft 32 the photocell-lamp unit can be positioned anywhere within the range of the meter from zero to full scale.

Referring now to FIGURE 3, the tab assembly is seen, generally denoted 16. Said tab assembly consists of two substantially parallel leaves 33 and 34 attached to arm 15 substantially as shown. The surfaces of leaves 33 and 34 which are to face the photocell-lamp combination are of a special nature. The surface of one leaf is coated with a non-reflective layer of black paint or the like. Contrarily, the surface of the other leaf is made highly reflective.

FIGURE 5 shows the circuit diagram of the relay coil circuit in one configuration thereof. The photocell 23 is shown with its electrodes 23–a connected to the base 35–b and the emitter 35–e of a current control element, herein shown as a transistor 35. The relay coil 36 has one electrode connected to the collector 35–c of transistor 35 while the other end of coil 36 is connected to a source of direct current 37. The other end of source 37 is returned to emitter 35–e. When light strikes the photosensitive surface of cell 23 a potential is produced as aforementioned, causing current to flow in the collector-to-base loop. Such a current, upon flowing through coil 36, produces a magnetic field, to actuate the relay switch 38. Upon the actuation of the relay switch the contacts thereof close to complete a circuit such as 39 thereby to achieve a desired result in a unit such as 40.

An example of an application of this invention, and therefore an example of what unit 40 might be, is in a radioactivity monitoring device. Such devices would be permanently stationed to continuously monitor radioactivity levels and by being provided with a meter of the type disclosed herein, could achieve a twofold result simply and accurately. The meter could be read periodically in the usual manner to provide a continuous check on activity levels. The meter relay system could be preset at a desired level such that should the activity level rise above said level a warning device would be sounded. Unit 40 might be such a warning device. This invention also has application to the monitoring of innumerable ambient conditions such as temperature, pressure, voltage and so on. In no way is it inferred by the above example that the scope of this invention is bound thereby.

While a PNP-type transistor is shown at 35 in FIGURE 5, it is deemed obvious to those versed in the art to substitute an NPN-type transistor or make any circuit changes which may be desirable while not altering the real function of this circuit. It is also seen that while the circuit shown presents conditions necessary to actuate the relay from an "open" state to a "closed" state as the tab moves from left to right, it is deemed obvious to so alter the circuit as to reverse the operation of said relay.

The operation of the relay triggering system may best be understood by referring to FIGURE 4. It is well known that the "pull-in" current of a relay is always greater than the "drop-out" current due to hysteresis effect, contact resistance, contact gap setting and so on, and the ratio thereof may be made to vary over a considerable range. For the purposes of this discussion, assume the relay requires 2 ma. to pull in and 0.75 ma. to drop out. In FIGURE 4-a the photocell unit is shown operating in its quiescent state wherein the tab or mask 16 is to the left or below the level at which it will influence said photocell unit. In said quiescent state the distance to and reflectivity of plate 27 is such as to cause a current of about 1.5 ma. to flow in coil 36. This current is midway between the pull-in and drop-out levels and therefore will maintain the relay in whatever state it may be.

In FIGURE 4-b the tab 16 has reached a point where it interrupts the light path to plate 27. The leading leaf or tab is the non-reflective leaf and since this non-reflective surface will decrease the amount of light reaching cell 23, the current level in coil 36 will drop. This drop in current will not adversely affect the relay assuming it is already open. Assume, for this discussion, that the current level in the coil drops to 0.5 ma.

As the tab travels further to the right, FIGURE 4-c, the highly reflective leaf becomes interspersed between the lamp 22 and plate 27. This highly reflective surface causes an increase in the amount of light reaching cell 23 and, in accordance with the operator of the circuit as explained above, the current level in coil 36 rises above the "pull-in" level, to about 2.5 ma., thereby energizing the relay.

As the tab 16 passes out of the light beam, said beam will again be reflected from plate 27, whereupon the current level will drop to the quiescent level of 1.5 ma. Since this is not below the drop out level, the relay will remain closed as the meter movement proceeds to the right.

The operation of the trigger system as the tab moves right to left is deemed obvious. When first the reflective leaf interrupts the beam, the current level rises, not affecting the state of the relay. When the non-reflective leaf interrupts the beam the current level drops to 0.5 ma. which is below the drop-out level of 0.75 ma., whereupon the relay de-energizes. As the tab proceeds out of the beam the current level returns to its quiescent state and the relay remains open.

It is considered obvious to reverse the operation of the relay, i.e., turning it from closed to open. It is also considered to be within the scope of this invention to add a plurality of photocell units to thereby trigger a plurality of relays at different points within the range of the instrument.

While the circuit shown utilizes a photocell unit to vary the current in the relay coil it is deemed within the scope of this invention to vary, by means of a tab or the like, any parameter of the circuit, FIGURE 5. In other words, the photocell could be replaced with a capacitor, inductor, etc. so that said tab would cause a variation in the capacitance, inductance, reluctance, etc. to initiate the triggering of the relay in the manner described above.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A system for actuating a relay from a rotatably supported coil, a tab having a varying degree of reflectivity, means for moving said tab responsive to said coil, detecting means responsive to the position of said tab, said detecting means including a lamp and a photocell, a variable current control element responsive to said detecting means, a relay operative in response to the current level provided by said current control element and means to apply the current from said control element to said relay to render it operative.

2. A system for actuating a relay from a meter movement comprising a meter coil, means for rotatably supporting said coil, a first arm attached to said coil to be movable therewith, said first arm being operable as an indicating means, a second arm attached to said coil to be synchronously movable with said first arm, a tab attached to the end of said second arm, said tab having a varying degree of reflectivity, detecting means responsive to the position of said tab, said detecting means including a lamp and a photocell, a variable current control element responsive to said detecting means, a relay operative in response to the current level provided by said current control element and means to apply the current from said control element to said relay to render it operative.

3. A system for actuating a relay from a meter movement comprising a meter coil, means for rotatably supporting said coil, a first arm attached to said coil to be movable therewith, said first arm being operable as an indicating means, a second arm attached to said coil to be synchronously movable with said first arm, a tab attached to the end of said second arm, said tab having a varying degree of reflectivity, detecting means responsive to the position of said tab, said detecting means including a lamp and a photocell, a variable current control element responsive to said detecting means to provide three distinct current levels, a relay operative in response to the current levels provided by said current control element, said current levels comprising a first value sufficient to energize said relay, a second current value less than said first value sufficient to alloy the relay to de-energize, and a third current value intermediate between said first and said second values such as will not change the state of said relay, and means to apply the current from said current control element to said relay to render it operative.

4. A system for actuating a relay from a meter movement comprising a meter coil, means for rotatably supporting said coil, a first arm attached to said coil to be movable therewith, said first arm being operable as an indicating means, a second arm attached to said coil to be synchronously movable with said first arm, a tab attached to the end of said second arm, said tab having a varying degree of reflectivity, detecting means responsive to the position of said tab, said detecting means including a lamp and a photocell, a transistor having base, emitter, and collector electrodes, said detecting means being connected to the base and the emitter of said transistor, a source of direct current, one electrode of said source of direct current being connected to the emitter of said transistor, a relay, said relay being connected to the second electrode of said current source and to the collector of said transistor, said tab and detecting means operative to produce three distinct current levels in said transistor, said relay operative in response to the current levels provided by said transistor, said current levels comprising a first value sufficient to energize said relay, a second value less than said first value sufficient to allow the relay to de-energize, and a third current value intermediate said first and second values such as will not change the state of said relay.

5. A system for actuating a relay from a meter movement comprising a meter coil, means for rotatably supporting said coil, a first arm attached to said coil to be movable therewith, said first arm being operable as an indicating means, a second arm attached to said coil to be synchronously movable with said first arm, a tab attached to the end of said second arm, said tab having a varying degree of reflectivity, detecting means responsive to the position of said tab, said detecting means comprising a lamp and a photoelectric cell, means for producing a single beam of light from said lamp, means opposite said lamp and photoelectric cell combination to reflect said light beam from said lamp to impinge on said cell, said reflecting means being so positioned as to allow said tab to pass intermediate said reflecting means and said lamp and cell aggregation, a transistor having base, emitter, and collector electrodes, said detecting means being connected to the base and the emitter of said transistor, a source of direct current, one electrode of said source of direct current being connected to the emitter of said transistor, a relay, said relay being connected to the second electrode of said current source and to the collector of said transistor, said tab and detecting means operative to produce three distinct current levels in said transistor, said relay operative in response to the current levels provided by said transistor, said current levels comprising a first valve sufficient to energize said relay, a second value less than said first value sufficient to allow the relay to de-energize, and a third current value intermediate said first and second values such as will not change the state of said relay.

6. A system of the type described in claim 5 wherein said relay is of the electromagnetic type.

7. A system as described in claim 5 wherein said tab comprises two substantially parallel leaves, one of said leaves having a light reflective surface, the other of said leaves having a non-reflective surface.

8. A system as described in claim 5 wherein said tab comprises one leaf having a continuously varying degree of reflectivity from high absorptive at one end to highly absorptive at the other.

References Cited in the file of this patent

UNITED STATES PATENTS 2,928,954     Stevenson _____ Mar. 15, 1960